(12) United States Patent
Waltermann et al.

(10) Patent No.: US 11,386,886 B2
(45) Date of Patent: Jul. 12, 2022

(54) ADJUSTING SPEECH RECOGNITION USING CONTEXTUAL INFORMATION

(71) Applicant: Lenovo (Singapore) Pte. Ltd., Singapore (SG)

(72) Inventors: Rod D. Waltermann, Rougemont, NC (US); Mark Evan Cohen, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/166,197

(22) Filed: Jan. 28, 2014

(65) Prior Publication Data

US 2015/0213796 A1 Jul. 30, 2015

(51) Int. Cl.
*G10L 15/18* (2013.01)
*G10L 15/22* (2006.01)

(52) U.S. Cl.
CPC .............. *G10L 15/18* (2013.01); *G10L 15/22* (2013.01); *G10L 2015/228* (2013.01)

(58) Field of Classification Search
CPC ....... G10L 15/22; G10L 15/183; G10L 15/00; G10L 15/19; G10L 15/193; G10L 15/065; G10L 15/14; G10L 2015/227; G10L 21/0208
USPC ..... 704/9, 10, 235, 245, 246, 251, 257, 265, 704/270, 275
See application file for complete search history.

(56) References Cited

U.S. PATENT DOCUMENTS

| | | | |
|---|---|---|---|
| 6,484,136 B1 | 11/2002 | Kanevsky et al. | |
| 8,762,156 B2* | 6/2014 | Chen | 704/275 |
| 2007/0294084 A1 | 12/2007 | Cross et al. | |
| 2008/0091426 A1* | 4/2008 | Rempel et al. | 704/251 |
| 2009/0150156 A1 | 6/2009 | Kennewick et al. | |
| 2010/0235167 A1 | 9/2010 | Bourdon | |
| 2012/0296654 A1* | 11/2012 | Hendrickson | G10L 13/02 704/260 |
| 2014/0025377 A1 | 1/2014 | Koch et al. | |
| 2014/0081636 A1* | 3/2014 | Erhart | G06Q 50/01 704/236 |
| 2014/0324428 A1* | 10/2014 | Farraro | 704/244 |
| 2015/0281853 A1* | 10/2015 | Eisner | H04R 25/505 381/312 |

FOREIGN PATENT DOCUMENTS

| | | |
|---|---|---|
| CN | 1659624 A | 8/2005 |
| CN | 101034390 A | 9/2007 |
| CN | 101290770 A | 10/2008 |
| CN | 101462522 A | 6/2009 |
| CN | 103430232 A | 12/2013 |
| WO | 2013101051 A1 | 7/2013 |

* cited by examiner

*Primary Examiner* — Thierry L Pham
(74) *Attorney, Agent, or Firm* — Ference & Associates LLC

(57) ABSTRACT

An embodiment provides a method, including: obtaining, using a processor, contextual information relating to an information handling device; adjusting, using a processor, an automated speech recognition engine using the contextual information; receiving, at an audio receiver of the information handling device, user speech input; and providing, using a processor, recognized speech based on the user speech input received and the contextual information adjustment to the automated speech recognition engine. Other aspects are described and claimed.

20 Claims, 3 Drawing Sheets

ADJUSTING SPEECH RECOGNITION USING CONTEXTUAL INFORMATION

BACKGROUND

Many information handling devices ("devices") provide the user with the ability to enter voice commands or otherwise provide speech input. Generally automated speech recognition (ASR) engines attempt to recognize the word(s) spoken and thereafter match or map the user's speech input to certain actions, e.g., speech based commands.

For example, a user may speak the words "email contact Name A" which, when parsed and processed by an ASR engine will, all things working properly, result in recognized speech of "email", "contact" and "Name A". Additionally, the ASR engine will, again all things working properly, map or match these particular words, e.g., using a command template, to a command input matched to the natural language meaning, i.e., that an email application should be used to begin drafting a new email message to the user's contact of "Name A". On the basis of this processing, a device may therefore respond to the user's natural language input in an appropriate fashion.

BRIEF SUMMARY

In summary, one aspect provides a method, comprising: obtaining, using a processor, contextual information relating to an information handling device; adjusting, using a processor, an automated speech recognition engine using the contextual information; receiving, at an audio receiver of the information handling device, user speech input; and providing, using a processor, recognized speech based on the user speech input received and the contextual information adjustment to the automated speech recognition engine.

Another aspect provides an information handling device, comprising: an audio receiver; a processor operatively coupled to the audio receiver; and a memory device storing instructions executable by the processor to: obtain contextual information relating to the information handling device; adjust an automated speech recognition engine using the contextual information; receive, at the audio receiver, user speech input; and provide recognized speech based on the user speech input received and the contextual information adjustment to the automated speech recognition engine.

A further aspect provides a program product, comprising: a storage medium comprising device readable program code, the code being executable by a processor and comprising: code that obtains, using a processor, contextual information relating to an information handling device; code that adjusts, using a processor, an automated speech recognition engine using the contextual information; code that receives, at an audio receiver of the information handling device, user speech input; and code that provides, using a processor, recognized speech based on the user speech input received and the contextual information adjustment to the automated speech recognition engine.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
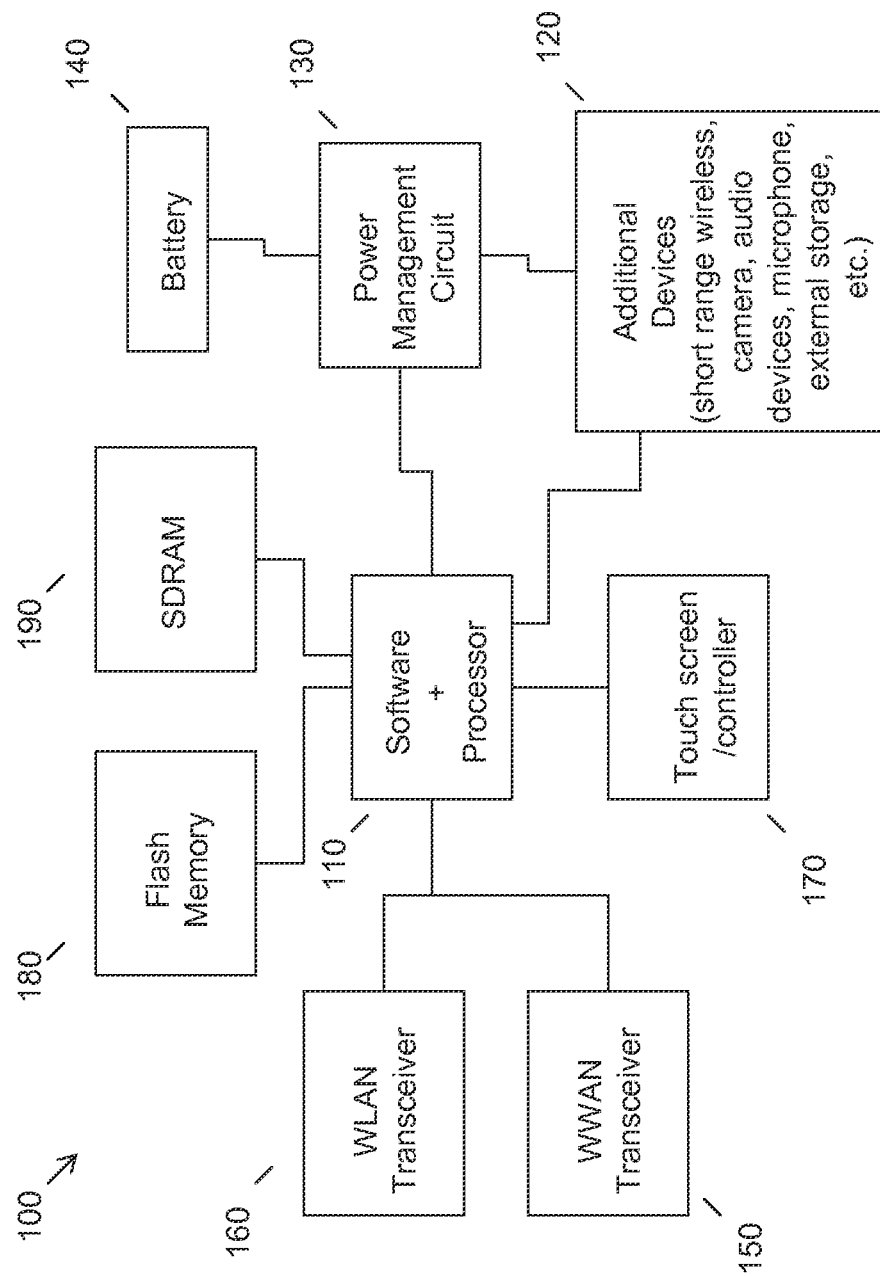
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While ASR engines tend to do reasonably well with faithfully recognizing/identifying words in most situations, this process may suffer in certain respects, particularly in a noisy environment. Speech recognition may be significantly improved by first determining a context, e.g., determining whether the user is in a particular situation or performing a particular task.

Accordingly, an embodiment obtains such contextual information and uses it to bias speech recognition towards words and/or commands that the user is most likely to be saying or requesting in the particular context. For example, if a user is listening to music it is more likely that a subsequent utterance will be a command to play something else or adjust the volume or otherwise operate a command for the music player application, etc., as compared to something totally unrelated, e.g., search for a restaurant location using a map application.

This is especially true and useful in noisy environments. The kinds of contextual information that may be used by an embodiment include but are not necessarily limited to contextual information relating to what a user is doing with the device (e.g., listening to music, watching a movie, viewing pictures, working with office documents, etc.), contextual information regarding what stimulus the device has recently received (e.g., incoming phone call, text message, ongoing calendar appointment, etc.), and contextual information relating to what is happening to the device (e.g., device is moving in a car, device is located in a noisy environment, device is located in a known position, etc.).

Therefor, by using contextual information to determine what the relevant context is, e.g., what the user is doing or which activity they are engaged in, etc., an embodiment may then adjust, e.g., "prime", the ASR engine to intelligently cue it into the relevant context. As may be appreciated throughout, this adjusting process may take a variety of forms, some of which may be combined with one another. As non-limiting examples, an embodiment may adjust the ASR engine by predetermining which words or phrases, based on the context, are more statistically likely to be received, by predetermining which commands, based on the context, are statistically more likely to be invoked, etc.

For example, given contextual information such as a music player application of the device is currently playing back music, commands such as "play", "stop", etc., may be given more weight than out of context commands, like "increase screen brightness", etc. Additionally, specific words that are deemed contextually relevant, e.g., words included within names of songs or artists in the user's music collection (on or off device) may similarly also be given a bias or increased weighting for recognition, e.g., if the word "play" was detected by the ASR. As such, this prevents the ASR engine promoting unlikely and out of context word recognition/command recognition results, e.g., based simply on the content of the speech input, but would also not prevent the user from giving different commands. In other words, an embodiment leverages contextual information to give contextually more likely words/commands a better chance of being recognized correctly.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces for example include SDIO and I2C.

There are power management chip(s) 130, e.g., a battery management unit, BMU, which manage power as supplied for example via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are often included, e.g., an audio receiver such as a microphone. Commonly, system 100 will include a touch screen 170 for data input and display. System 100 also typically includes various memory devices, for example flash memory 180 and SDRAM 190.

Figure 2:
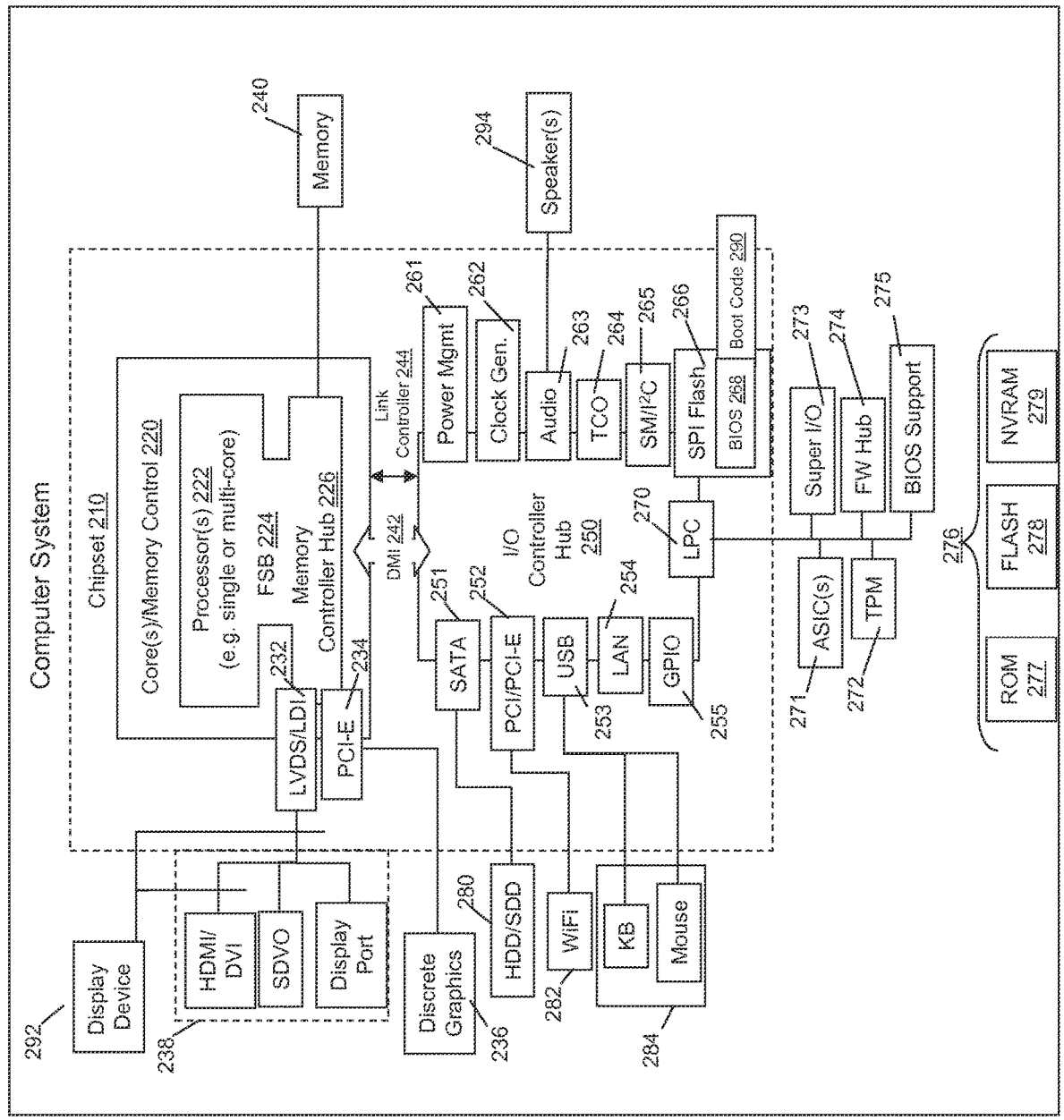
FIG. 2 illustrates another example of information handling device circuitry.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). The architecture of the chipset 210 includes a core and memory control group 220 and an I/O controller hub 250 that exchanges information (for example, data, signals, commands, et cetera) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, et cetera). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may used in devices that provide for adjusting an ASR engine based on contextual information. For example, the circuitry outlined in FIG. 1 and FIG. 2 may be included in devices that receive speech inputs, e.g., via a microphone of the device, process the received speech inputs to provide recognition results, e.g., including mapping the speech input to commands, while taking into account various sources of contextual information, as further described herein.

Figure 3:
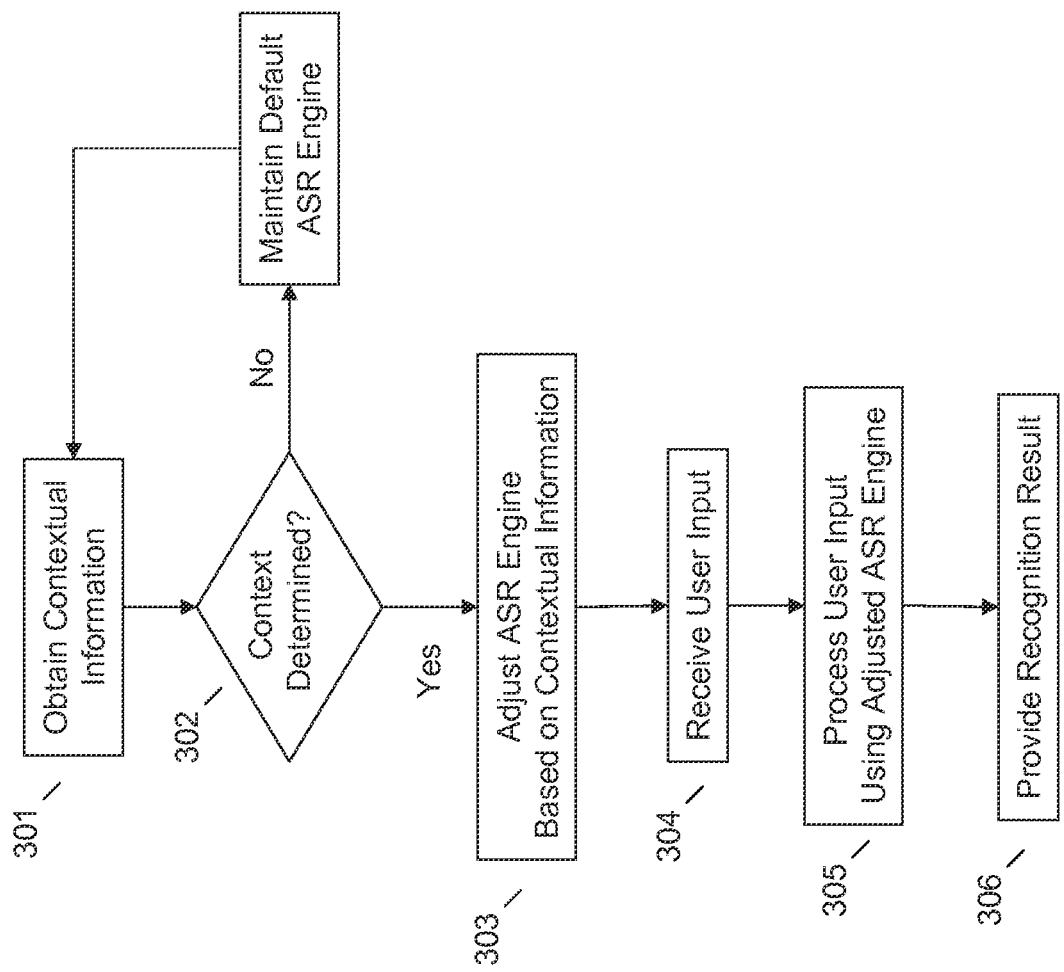
FIG. 3 illustrates an example method of adjusting speech recognition using contextual information.

Referring to FIG. 3, for example, an embodiment may obtain contextual information at 301, e.g., relating to operation of an information handling device. The contextual information relates to the context in which the user is attempting to use the ASR engine, e.g., device location, device movement, running applications, device events (e.g., received communications, etc.) as opposed to what might conventionally be thought of as contextual information for an ASR, e.g., contextual information relating to the content of the speech input.

An embodiment may, having access to contextual information (which may be derived from the device or another device in communication therewith, e.g., via a cloud account), determine a context at 302 and thereafter adjust an automated speech recognition engine using the contextual information at 303. An embodiment may determine a context exists based on the available contextual information in a variety of ways, e.g., mapping predetermined contextual information input(s) to one or a plurality of known contexts, e.g., music player, work, home, in-vehicle, navigation, etc.

The adjustments made to the ASR engine at 303 may also take a variety of forms. For example, the adjusting may comprise selecting a knowledge domain or template (e.g., maps for navigation context, telephony for received communication context, etc.) based on the contextual information. The adjusting may comprise selecting a lexicon based on the contextual information, e.g., selecting the words and/or commands available given the context. The adjusting may comprise weighting one or more words and/or one or more commands differently based on the contextual information. The adjusting may also comprise adjusting the matching between recognized speech and a predetermined action (e.g., action matched to a command) based on the contextual information. These adjustments may be used alone or in a suitable combination.

Having adjusted the ASR engine or "primed" it, an embodiment may receive, e.g., at an audio receiver such as a microphone, user speech input at 304 and process the received input using the adjusted ASR engine at 305. This permits an embodiment to utilize the adjusted ASR to promote contextually relevant words and/or commands and/or predetermined actions that are contextually relevant based on the contextual information available. Thus, an embodiment may provide recognized speech based on the user speech input and the contextual information adjustment to the ASR engine at 306. The recognized speech of 306 may of course include automated committing of actions, e.g., mapped to the recognized speech based on the use of the adjusted ASR engine.

Because device connectivity is ever increasing, the contextual information sources may be provided via the local device, e.g., via using device sensor(s) and/or processing or may be provided via connected devices, directly or indirectly, and suitable combinations thereof. Thus the contextual information may be selected from the group consisting of contextual information relating to user interaction with the information handling device, contextual information relating to running applications of the information handling device, contextual information relating to received stimulus of the information handling device, and contextual information relating to sensed environment of the information handling device, among others. Likewise, the context determined at 302 may be transferred from device to device such that a user may have a continuity of experience, e.g., when transitioning between devices.

Therefore, an embodiment provides for adjustment of speech recognition such that context of use in taken into account. As stated herein, this does not preclude out of context use but rather tends to target misidentification of in-context words/commands/actions. An embodiment thus facilitates the user's experience with the ASR engine inasmuch as it makes the ASR engine behave much more like a human listening to commands that are received, filtered and understood within a particular context.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    obtaining, using a processor, contextual information relating to an information handling device;
    adjusting, before receipt of any user speech input, using a processor, an automated speech recognition engine using the contextual information, wherein the adjusting comprises selecting a knowledge domain based on the contextual information for the automated speech recognition engine;
    thereafter receiving, at an audio receiver of the information handling device, user speech input; and
    providing, using a processor, recognized speech based on the user speech input received and the contextual information adjustment to the automated speech recognition engine.

2. The method of claim 1, wherein said adjusting comprises selecting a knowledge domain based on the contextual information.

3. The method of claim 1, wherein said adjusting comprises selecting a lexicon based on the contextual information.

4. The method of claim 1, wherein said adjusting comprises weighting one or more words based on the contextual information.

5. The method of claim 1, further comprising committing a predetermined action matching the recognized speech;
    wherein said adjusting comprises adjusting the matching between recognized speech and a predetermined action based on the contextual information.

6. The method of claim 1, further comprising:
    providing a communication to the user including estimated recognized speech based on the user speech input and the contextual information adjustment to the automated speech recognition engine; and
    committing a predetermined action matching the recognized speech.

7. The method of claim 6, further comprising receiving user input associated with the communication;
    wherein said committing a predetermined action matching the recognized speech proceeds responsive thereto.

8. The method of claim 1, wherein said contextual information is selected from the group consisting of contextual information relating to user interaction with the information handling device, contextual information relating to running applications of the information handling device, contextual information relating to received stimulus of the information handling device, and contextual information relating to sensed environment of the information handling device.

9. The method of claim 1, wherein the contextual information is derived from the information handling device.

10. The method of claim 1, wherein the contextual information is transferrable to another information handling device.

11. An information handling device, comprising:
    an audio receiver;
    a processor operatively coupled to the audio receiver; and
    a memory device storing instructions executable by the processor to:
    obtain contextual information relating to the information handling device;
    adjust, before receipt of any user speech input, an automated speech recognition engine using the contextual information, wherein to adjust comprises selecting a knowledge domain based on the contextual information for the automated speech recognition engine;
    thereafter receive, at the audio receiver, user speech input; and
    provide recognized speech based on the user speech input received and the contextual information adjustment to the automated speech recognition engine.

12. The information handling device of claim 11, wherein to adjust comprises selecting a knowledge domain based on the contextual information.

13. The information handling device of claim 11, wherein to adjust comprises selecting a lexicon based on the contextual information.

14. The information handling device of claim 11, wherein to adjust comprises weighting one or more words based on the contextual information.

15. The information handling device of claim 11, wherein the instructions are further executable by the processor to commit a predetermined action matching the recognized speech;
    wherein to adjust comprises adjusting the matching between recognized speech and a predetermined action based on the contextual information.

16. The information handling device of claim 11, wherein the instructions are further executable by the processor to:
    provide a communication to the user including estimated recognized speech based on the user speech input and the contextual information adjustment to the automated speech recognition engine; and
    commit a predetermined action matching the recognized speech.

17. The information handling device of claim 16, wherein the instructions are further executable by the processor to receive user input associated with the communication;
    wherein committing of a predetermined action matching the recognized speech proceeds responsive thereto.

18. The information handling device of claim 11, wherein said contextual information is selected from the group consisting of contextual information relating to user interaction with the information handling device, contextual information relating to running applications of the information handling device, contextual information relating to received stimulus of the information handling device, and contextual information relating to sensed environment of the information handling device.

19. The information handling device of claim 11, wherein the contextual information is derived from the information handling device.

20. A program product, comprising:
    a storage medium comprising device readable program code, the code being executable by a processor and comprising:

code that obtains, using a processor, contextual information relating to an information handling device;

code that adjusts, before receipt of any user speech input, using a processor, an automated speech recognition engine using the contextual information, wherein the code that adjusts comprises selecting a knowledge domain based on the contextual information for the automated speech recognition engine;

code that thereafter receives, at an audio receiver of the information handling device, user speech input; and code that provides, using a processor, recognized speech based on the user speech input received and the contextual information adjustment to the automated speech recognition engine.

* * * * *